(12) United States Patent
Yoshihara et al.

(10) Patent No.: US 10,131,809 B2
(45) Date of Patent: Nov. 20, 2018

(54) OPTICAL LAYERED BODY, POLARIZER AND IMAGE DISPLAY DEVICE

(71) Applicant: Dai Nippon Printing Co., Ltd., Tokyo (JP)

(72) Inventors: Toshio Yoshihara, Tokyo (JP); Tomoyuki Horio, Tokyo (JP); Mayu Youki, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 355 days.

(21) Appl. No.: 14/314,728

(22) Filed: Jun. 25, 2014

(65) Prior Publication Data
US 2014/0308533 A1 Oct. 16, 2014

Related U.S. Application Data

(62) Division of application No. 13/697,428, filed as application No. PCT/JP2011/060968 on May 12, 2011, now abandoned.

(30) Foreign Application Priority Data

May 12, 2010 (JP) .................. 2010-110525

(51) Int. Cl.
G02B 1/14 (2015.01)
C09D 133/10 (2006.01)
G02B 1/16 (2015.01)
C09D 133/14 (2006.01)
C09D 175/16 (2006.01)
G02B 1/10 (2015.01)
G02B 1/04 (2006.01)
G02B 1/08 (2006.01)
C08G 18/67 (2006.01)
(Continued)

(52) U.S. Cl.
CPC ........ *C09D 133/10* (2013.01); *C08F 290/067* (2013.01); *C08G 18/672* (2013.01); *C09D 4/06* (2013.01); *C09D 133/14* (2013.01); *C09D 175/16* (2013.01); *G02B 1/04* (2013.01); *G02B 1/08* (2013.01); *G02B 1/105* (2013.01); *G02B 1/14* (2015.01); *G02B 1/16* (2015.01);
(Continued)

(58) Field of Classification Search
CPC ........................................................ G02B 1/14
USPC .................................................. 427/162–169
See application file for complete search history.

(56) References Cited

U.S. PATENT DOCUMENTS

2003/0129421 A1* 7/2003 Terauchi et al. .............. 428/447
2008/0192351 A1* 8/2008 Miyagawa et al. ........... 359/586
(Continued)

FOREIGN PATENT DOCUMENTS

JP 05-339306 A 12/1993
JP 11042729 A 2/1999
(Continued)

*Primary Examiner* — Elizabeth A Burkhart
(74) *Attorney, Agent, or Firm* — Hamre, Schumann, Mueller & Larson, P.C.

(57) ABSTRACT

The present invention provides an optical layered body having excellent antistatic properties, optical characteristics, hardness, adhesion, and interference fringe prevention performance, which can be produced at a low cost.
An optical layered body having a hard coat layer provided on a triacetylcellulose substrate, wherein a resin composition used for forming the hard coat layer contains a quaternary ammonium salt-containing polymer, a binder resin, and a solvent; the quaternary ammonium salt-containing polymer has a higher hydrophilicity than the binder resin; and the binder resin contains two or more resin components having different hydrophilicities.

9 Claims, 1 Drawing Sheet

(51) Int. Cl.
    *C08F 290/06*     (2006.01)
    *C09D 4/06*     (2006.01)
    *C08L 33/14*     (2006.01)

(52) U.S. Cl.
    CPC ....... *C08L 33/14* (2013.01); *Y10T 428/31591* (2015.04); *Y10T 428/31786* (2015.04); *Y10T 428/31891* (2015.04); *Y10T 428/31935* (2015.04); *Y10T 428/31971* (2015.04)

(56) References Cited

U.S. PATENT DOCUMENTS

| | | | |
|---|---|---|---|
| 2009/0075074 A1* | 3/2009 | Horio et al. | 428/341 |
| 2010/0067109 A1 | 3/2010 | Horio et al. | |
| 2010/0165460 A1* | 7/2010 | Furui | G02B 1/105 359/488.01 |

FOREIGN PATENT DOCUMENTS

| | | | |
|---|---|---|---|
| JP | 2000-129245 A | | 5/2000 |
| JP | 2002-003751 A | | 1/2002 |
| JP | 2004-094007 A | | 3/2004 |
| JP | 2004-338379 A | | 12/2004 |
| JP | 2005-154749 A | | 6/2005 |
| JP | 2007-296751 A | | 11/2007 |
| JP | 2009-086660 A | | 4/2009 |
| JP | 2010-076105 A | | 4/2010 |
| JP | 2010-077174 A | | 4/2010 |
| JP | 2010-085983 A | | 4/2010 |
| WO | WO 2008/020613 | * | 2/2008 |

\* cited by examiner (a)

(b)

(c)

OPTICAL LAYERED BODY, POLARIZER AND IMAGE DISPLAY DEVICE

CROSS REFERENCE TO RELATED APPLICATIONS

This application is Divisional of co-pending application Ser. No. 13/697,428 filed on Jan. 28, 2013, which is a National Phase filing under 35 U.S.C. § 371 of PCT/JP2010/060968 filed on May 12, 2011; and this application claims priority to Application No. 2010-110525 filed in Japan on May 12, 2010 under 35 U.S.C. § 119; the entire contents of all are hereby incorporated by reference.

TECHNICAL FIELD

The present indention relates to an optical layered body, a polarizer, and an image display device.

BACKGROUND ART

An optical layered body including function layers with various functions such as antireflection properties and antistatic properties is generally provided on the outermost surface of image display devices such as cathode-ray tube (CRT) display devices, liquid crystal displays (LCDs), plasma display panels (PDPs), electroluminescence displays (ELDs), field emission displays (FEDs), touch panels, and electronic paper.

As one of such function layers of the optical layered body, an antistatic layer for presenting adhesion of dust and dirt caused by static electrification is known (for examples, see Patent Literatures 1 to 5).

The antistatic layer is generally forced by using an antistatic agent. Known examples of the antistatic agent include metal oxide-based conductive ultrafine particles such as antimony-doped tin oxide (ATO) and tin-doped indium oxide (ITO), organic conductive polymers, and quaternary ammonium salt-based conductive materials. Of these, quaternary ammonium salts are often used these days as coating-type antistatic agents. For example, Patent Literature 6 discloses a cationic copolymer having a quaternary ammonium salt group with an excellent solubility in hydrophobic solvents and resin.

As another function layer, a hard coat layer for providing a certain degree of strength to the optical layered body is also known.

Such an antistatic layer and a hard coat layer provided on the optical layered body have been formed as separate layers on respective transparent substrates (for example, see Patent Literature 7).

Therefore, steps for separately forcing an antistatic layer and a hard coat layer were necessary, thus disadvantageously increasing the production process and the production cost of the optical layered body.

In response to these problems, fox example, a hard coat layer and an antistatic layer may possibly be formed as a single layer by adding an antistatic agent to the hard coat layer, as a method for simplifying the production process in order to reduce the production cost of the optical layered body.

However, there have been problems: imparting sufficient antistatic properties to the hard coat layer reduced the transparency of the hard coat layer, while imparting sufficient transparency to the hard coat layer resulted in insufficient antistatic properties. Additionally, imparting sufficient antistatic properties to the hard coat layer disadvantageously resulted in insufficient adhesion of the hard coat layer to another layer provided thereon.

As described above, when the hard coat layer and the antistatic layer are formed as a single layer, it has been difficult to obtain an optical layered body having excellent antistatic properties, optical characteristics, and adhesion to other layers.

CITATION LIST

Patent Literature

Patent Literature 1: Japanese Kokai Publication H05-339306
Patent Literature 2: Japanese Kokai Publication H11-42729
Patent Literature 3: Japanese Kokai Publication 2002-3751
Patent Literature 4: Japanese Kokai Publication 2004-338379
Patent Literature 5: Japanese Kokai Publication 2005-154749
Patent Literature 6: Japanese Kokai Publication 2000-129245
Patent Literature 7: Japanese Kokai Publication 2004-94007

SUMMARY OF INVENTION

Technical Problem

In view of the above-described current situation, the present invent aims to provide an optical layered body, a polarizer, and an image display device, which have excellent antistatic properties, optical characteristics, hardness, adhesion, and interference fringe prevention performance, and are also capable of reducing the production cost.

Solution to Problems

The present invention is an optical layered body comprising a hard coat layer provided on a triacetylcellulose substrate, wherein a resin composition used for forming the hard coat layer contains a quaternary ammonium salt-containing polymer, a binder resin, and a solvent, the quaternary ammonium salt-containing polymer has a higher hydrophilicity than the binder resin, and the binder resin contains two or more resin components having different hydrophilicities.

Preferably, the quaternary ammonium salt-containing polymer is a copolymerized product of a dimethylaminoethyl methacrylate quaternary ammonium salt and a (meth)acrylate compound at a mass ratio of 1/99 to 90/10.

Preferably, the quaternary ammonium salt-containing polymer is contained in an amount of 1.0 to 10% by mass in the solids content of the resin composition.

Preferably, the two or more resin components having different hydrophilicities are a monomer having a weight-average molecular weight of 600 or less and an oligomer having a weight-average molecular weight of 1,000 to 10,000, and the hydrophilicity of the monomer is higher than that of the oligomer.

Preferably, the monomer having a weight-average molecular weight of 600 or less includes at least one selected from the group consisting of pentaerythritol tri(meth)acrylate, dipantaerythritol hexa(meth)acrylate, polyester tri(meth)acrylate, polyester di(meth)acrylate, isocyanuric acid ethylene oxide-modified tri(meth)acrylate, isocyanuric acid ethylene oxide-modified di(meth)acrylate, polyester ethylene oxide-modified tri(meth)acrylate, ethylene oxide-modified di(meth)acrylate, and propylene oxide-modified di(meth)acrylate, and the oligomer having a weight-average molecular-weight of 1,000 to 10,000 is a urethane (meth) acrylate.

The above solvent preferably contains two or more solvents having different hydrophilicities.

The solvent preferably contains a penetrating solvent having an ability to penetrate the triacetylcellulose substrate.

Further, the optical layered body of the present invention preferably has a surface resistance value of $1 \times 10^{11}$ Ω/□ or less and a haze of 0.7% or less.

The present invention is also a polarizer comprising a polarizing element, wherein the polarizer comprises the above-described optical layered body on a surface of the polarizing element.

The present invention is also an image display device comprising the optical layered body or the polarizer on the outermost surface thereof.

The present invention is described in detail below.

The present invention is an optical layered body having a hard coat layer provided on a triacetylcellulose substrate.

In the optical layered body of the present invention, the hard coat layer is formed by using a resin composition, wherein the resin composition contains a quaternary ammonium salt-containing polymer, a specific binder resin, and a solvent, and the hydrophilicity of the quaternary ammonium salt-containing polymer has a specific relationship with the hydrophilicity of the binder resin.

The hard coat layer is fumed using such a resin composition, thus allowing the formation of an optical layered body having excellent antistatic properties, optical characteristics, hardness, adhesion between the hard coat layer and another function layer other than the hard coat layer, and interference fringe prevention performance.

Further, as used herein, the term "(meth)acrylate" includes both acrylate and methacrylate.

The resin composition is used for forming a hard coat layer of the optical layered body of the present invention, wherein the hard coat layer is provided on a triacetylcellulose substrate.

The triacetylcellulose substrate has a smooth surface, resistance to heat, and an excellent mechanical strength.

The thickness of the triacetylcellulose substrate is preferably 20 μm or more to 300 μm or less. More preferably, the lower limit is 30 μm and the upper limit is 200 μm. In forming the hard coat layer and the like on the triacetylcellulose substrate, the triacetylcellulose substrate may be previously subjected to physical treatment such as corona discharge treatment and oxidation treatment as well as application of an anchoring agent or a coating material called primer, in order to improve the adhesion.

Further, the hard coat layer is a layer having a hardness of "H" or harder in the pencil hardness test, specified by JIB K 5600-5-4 (1999). Because such a hard coat layer is provided, the hardness and mechanical strength of the optical layered body can be increased.

The resin composition contains a quaternary ammonium salt-containing polymer.

Because the quaternary ammonium salt-containing polymer is contained, excellent antistatic properties and the like can be imparted to the optical layered body of the present invention produced using the above resin composition.

The quaternary ammonium salt-containing polymer is preferably a copolymerized product of a dimethylaminoethyl methacrylate quaternary ammonium salt and a (meth) acrylate; compound. The use of such a quaternary ammonium salt-containing polymer can not only result in an increased hardness of the hard cost layer formed but can also improve adhesion between the hard coat layer and another layer provided thereon.

The (meth)acrylate compound preferably contains a straight-chain hydrocarbon or a cyclic hydrocarbon. Specific examples of the (meth)acrylate compound include octyl (meth)acrylate, nonyl(meth)acrylate, decyl(meth)acrylate, undecyl(meth)acrylate, dodecyl (meth)acrylate, tridscyl (meth)acrylate, tetradecyl(meth)acrylate, pentadecyl (meth) acrylate, hexadecyl(meth)acrylate, heptadecyl (meth)acrylate, octadecyl(meth)acrylate, nonadecyl (meth) acrylate, eicosyl (meth) acrylate, 2-ethylhexyl (meth)acrylate, and cyclohexyl(meth)acrylate, As the (meth)acrylate compound, these examples may foe used singly or in combination of two or more thereof; or the (meth)acrylate compound may be a copolymer of these compounds.

Of these, at least one selected from the group consisting of dodecyl(meth)acrylate, tridecyl(meth)acrylate, and cyclohexyl(meth)acrylate is preferable, in view of obtaining good antistatic properties.

Preferably, the quaternary ammonium salt-containing polymer is a copolymerized product of the dimethylaminoethyl methacrylate quaternary ammonium salt and the (meth)acrylate compound at a mass ratio of 1/99 to 90/10 (dimethylaminoethyl methacrylate quaternary ammonium salt/(meth)acrylate compound).

When the above mass ratio is less than 1/99, antistatic properties may not be obtained. When the above mass ratio is mote than 90/10, the solubility in the binder resin is deteriorated. This causes whitening and the like, and may cause moisture to be easily absorbed.

More preferably, the lower limit of the above mass ratio is 5/95 and the upper limit thereof is 85/15.

Further, the quaternary ammonium salt-containing polymer preferably contains no water. When the quaternary ammonium salt-containing polymer contains water, it increases the water content in the resin composition, causing gelation of the resin composition. As a result, it may not be possible to suitably form a hard coat layer having sufficient antistatic properties, or the quality of the resulting product may be degraded due to the presence of a gel.

The quaternary ammonium salt-containing polymer preferably has a weight-average molecular weight of 1,000 to 50,000. In the case of the weight-average molecular weight being less than 1,000, when a penetrating solvent (described later) is used as the solvent, the quaternary ammonium salt-containing polymer may penetrate the substrate during production of the optical layered body, and the antistatic properties of the produced optical layered body may be unsatisfactory. Further, when the quaternary ammonium salt-containing polymer is contained excessively to obtain an optical layered body having sufficient antistatic properties, it may become a cause of a decrease in optical characteristics and an insufficient hardness of the hard coat layer. When the weight-average molecular weight exceeds 50,000, it increases the viscosity of the resin composition, deteriorating the coating property, and, as described later, preventing the quaternary ammonium salt-containing polymer from effectively moving to the upper portion of the hard coat layer. Therefore, the position of the quaternary ammonium salt-containing polymer in the hard coat layer cannot be optimised, and necessary antistatic properties cannot be obtained in some cases. A more preferable lower limit of the weight-average molecular weight is 1,200, and a more preferable upper limit is 30,000. A still more preferable lower limit is 5,000, and a still more preferable upper limit is 20,000.

The weight-average molecular weight of the quaternary ammonium salt-containing polymer can be determined by polystyrene conversion measured by gel permeation chromatography (GPC), tetrahydrofuran and chloroform can be used as the solvents in the GPC mobile phase. Commercially available columns for tetrahydrofuran or chloroform may be suitably combined and used as the columns for measurement. Examples of the commercially available columns include Shades GPC KF-001, GPC KF-002, GPC RF-S03, GPC KF-S04, and GPC KF-800D (all trade names; produced by Showa Denko K.K.) An RI (differential refractive index) detector and an UV detector may be used as the detectors. Using such solvents, columns, and detectors, the weight-average molecular weight can be appropriately measured, for example, with a GPC system such as Shodex GPC-101 (produced by Show Denko K.K.) or the like.

Examples of commercially available quaternary ammonium salt-containing polymers that can be used in the present invention include H6100, H6100M, H6500 (produced by Mitsubishi Chemical Corporation), COLCOAT NR121X and COLCOAT NR121X-9IPA (produced by Colcoat Co., Ltd.), 1SX3000, 1SX3004 (produced by Taisei Fine Chemical Co., Ltd.), Uniresin AS-10/M, Uniresin AS-12/M, Uniresin AS-15/M, Uniresin ASH26 (produced by Shin-Nakamura Chemical Co, Ltd.), and UV-ASHC-01 (produced by Nippon Kasei Chemical Co., Ltd.). In particular, H6100, H6100M, and H6500 are suitably used.

Further, in the present invention, the quaternary ammonium salt-containing polymer has a higher hydrophilicity than the binder resin (described later). Because the hydrophilicity of the quaternary ammonium salt-containing polymer relative to the binder resin is as described above, a hard coat layer formation mechanism (described later) is achieved using the above-described resin composition. As a result, it is possible to produce an optical layered body having excellent antistatic properties, optical characteristics, hardness, and adhesion between the hard coat layer and another function layer other than the hard coat layer. The reason therefor is described later.

The "hydrophilicity" described above is represented by the water contact angle of a coating film when the coating film is formed by curing each resin component. The smaller the contact angle, the higher the hydrophilicity.

The content of the quaternary ammonium salt-containing polymer is preferably 1.0 to 10% by mass in the solids content of the resin composition. When the content is less than 1.0% by mass, desired antistatic properties may not be provided. When the content exceeds 10% by mass, it may decrease the hardness of the hard coat layer formed and the optical characteristics or the optical layered body produced.

A more preferable lower limit of the content of the quaternary ammonium salt-containing polymer is 1.5% by mass, and a more preferable upper limit is 5.0% by mass. A still more preferable upper limit is 3.0% by mass.

The above-described resin composition contains a binder resin.

The binder resin is preferably an ionising radiation-curable resin that is cured by ultraviolet light or electron beam. As used herein, the term "resin" includes both monomer and oligomer.

Examples of the ionising radiation-curable resin include compounds having one or two or more unsaturated bonds, such as a compound having an acrylate-based functional group.

Examples of the compound having one unsaturated bond include ethyl (meth)acrylate, ethylhexyl (meth)acrylate, styrene, methylstyrene, and N-vinylpyrrolidone.

Examples of the compound having two or more unsaturated bond include polymethylolpropanetri (meth)acrylate, hexanediol (meth)acrylate, tripropylene glycol di(meth) acrylate, diethylene glycol di(meth)acrylate, pentacrythritol tri(meth)acrylate, dipentaerythritol hexa(meth)acrylate, dipentaerythritol penta(meth)acrylate, 1,6-hexanediol di(meth)acrylate, neopentylglycol di(meth)acrylate; and reaction products of these compounds with (meth)acrylate and the like (for example, poly(meth)acrylate esters of polyols).

Additionally, these compounds may have a partially modified molecular framework, and those modified by ethylene oxide, propylene oxide, caprolactone, isocyanuric acid, alkyl groups, cyclic alkyl groups, aromatic compounds, bisphenol and the like may also be used.

In addition to the above-described compounds, relatively low-molecular weight resins having an unsaturated double bond, such as polyester resins, polyether resins, acrylic resins, epoxy resins, urethane resins, alkyd resins, spiroacetal resins, polybutadiene resins, and polythiol-polyene resins may also be used as the ionising radiation-curable resins.

The above binder resin contains two or more resin components having different hydrophilicities. Forming a hard coat layer using the two or more resin components having different hydrophilicities allows obtaining of an optical layered body having the above-described effects.

The two or more resin components having different hydrophilicities indicate that when coating films are formed by curing each resin component, the resulting coating films differ in water contact angle by 2 degree or more.

In the present invention, the two or more resin components having different hydrophilicities are suitably selected, for the binder resin from the above-described examples.

In particular, a monomer having a weight-average molecular weight of 600 or less and an oligomer having a weight-average molecular weight of 1,000 to 10,000 are preferable as the two or more resin components having different hydrophilicities.

In regard to the monomer having a weight-average molecular weight of 600 or less, when the weight-average molecular weight exceeds 600, it makes it difficult for the monomer to penetrate the substrate. This may cause degradation of the adhesion and the occurrence of an interference fringe. The weight-average molecular weight is preferably 550 or less.

The weight-average molecular weight can be measured by a method similar to the method for measuring the weight-average molecular weight of the quaternary ammonium salt-containing polymer.

The monomer having a weight-average molecular weight of 600 or less preferably includes at least one selected from the group consisting of pentaerythritol tri(meth)acrylate, dipentaerythritol hexa(meth)acrylate, polyester tri(meth) acrylate, polyester di(meth)acrylate, isocyanuric acid ethylene oxide (EO)-modified tri(meth)acrylate, isocyanuric acid ethylene oxide-modified di(meth)acrylate, polyester ethylene oxide (EO)-modified tri(meth)acrylate, ethylene oxide (EO)-modified di(meth)acrylate, and propylene oxide-modified di(meth)acrylate.

More preferably, the monomer having a weight-average molecular weight of 600 or less includes, in addition to pentaerythritol tri(meth)acrylate and dipentaerythritol hexa (meth)acrylate, at least one selected from the group consisting of polyester tri(meth)acrylate, polyester di(meth)acrylate, isocyanuric acid ethylene oxide (EO)-modified tri (meth)acrylate, isocyanuric acid ethylene oxide-modified di(meth)acrylate, polyester ethylene oxide (EO)-modified tri(meth)acrylate, ethylene, oxide (EO)-modified di(meth) acrylate, and propylene oxide-modified di(meth)acrylate.

The monomer having a weight-average molecular weight of 600 or less is preferably contained in an amount of 10 to 80% by mass in the solids content of the resin composition. When the content is less than 10% by mass, an interference fringe may be formed and the adhesion to the substrate may be degraded. When the content is more than 30% by mass, the solubility in the quaternary ammonium salt-containing polymer is increased, and the antistatic properties may thus not be obtained.

In regard to the oligomer having a weight-average molecular weight of 1,000 to 10,000, when the weight-average molecular weight is less than 1,000, it may be difficult to form a hard coat layer having desired effects. When the weight-average molecular weight exceeds 10,000, the viscosity is increased, possibly resulting in a degradation of the coating surface and a decrease in the hardness and compatibility with the quaternary ammonium salt-containing polymer. The weight-average molecular weight is more preferably 1,000 to 7,000.

The weight-average molecular weight can be measured by a method similar to the method for measuring the weight-average molecular weight of the quaternary ammonium salt-containing polymer.

The oligomer having a weight-average molecular weight of 1,000 to 10,000 is preferably a urethane(meth)acrylate.

In the case where the hard coat layer contains a urethane (meth)acrylate as the oligomer having a weight-average molecular weight of 1,000 to 10,000, the hard coat layer has good adhesion to other function layers and excellent hardness, compared to the case where the hard coat layer contains a different oligomer or a monomeric or polymeric urethane (meth)acrylate.

Examples of commercially-available urethane (meth) acrylates include Shiko series such as UV1700B, UV6300B, UV765B, UV7640B, and UV7600B produced by Nippon Synthetic Chemical Industry Co., Ltd.; Artresin series such as Artresin HDP, Artresin UN3320HSBA, UN9000H, Artresin UN3320HA, Artresin UN3320HB, Artresin UN3320HC, Artresin UN3320HS, Artresin UN901M, Artresin UN902MS, and Artresin UH903 produced by Negami Chemical Industrial Co., Ltd.; UA100H, U4H, U4HA, U6H, U6HA, U15HA, UA32P, U6LPA, U324A, and U9HAMI produced by Shin-Nakamura Chemical Co., Ltd.; Ebecryl series such as Ebecryl 1290, Ebecryl 5129, Ebecryl 254, Ebecryl 264, Ebecryl 265, Ebecryl 1259, Ebecryl 1264, Ebecryl 4866, Ebecryl 9260, Ebecryl 8210, Ebecryl 204, Ebecryl 205, Ebecryl 6602, Ebecryl 220, and Ebecryl 4450 produced by Daicel-UCD Co., Ltd.; Beamset series such as Beamset 371 and Beamset 577 produced by Arakawa Chemical Industries, Ltd.; RQ series produced by Mitsubishi Rayon Co., Ltd.; Unidic series produced by DIC Corporation; DPHA40H produced by Nippon Kayaku Co., Ltd.; and CN9006, CN968, and the like produced by Sartomer. Of these, preferable examples include UV1700B (Nippon Synthetic Chemical Industry Co., Ltd.), DPHA40H (Nippon Kayaka Co., Ltd.), Artresin HDP (Negami Chemical Industrial Co., Ltd.), Beamset 371 (Arakawa Chemical Industries, Ltd.), Beamset 577 (Arakawa Chemical Industries, Ltd.), and U15HA (Shin-Nakamura Chemical Co., Ltd.).

Further, the oligomer having a weight-average molecular weight of 1,000 to 10,000 preferably has four or more functional groups. When the number of functional groups is less than four, the hardness may be decreased. The number of functional groups is more preferably 6 or more.

The oligomer having a weight-average molecular weight of 1,000 to 10,000 is preferably contained in an amount of 10 to 80% by mass in the solids content of the resin composition. When the content is less than 10% by mass, an interference fringe may be formed and the adhesion to the substrate may be degraded. When the content is more than 80% by mass, the solubility in the quaternary ammonium salt-containing polymer is degraded, which may cause white turbidity or gelation.

The above resin composition contains a solvent.

As the solvent, a hydrophilic solvent or a hydrophobic solvent can be suitably selected and used according to the type and solubility of the binder resin. The "hydrophilicity" as used herein is determined according to the presence or absence of an OH group. A solvent containing an OH group in the molecule is referred to as a hydrophilic solvent, whereas a solvent that does not contain an OH group in the molecule is referred to as a hydrophobic solvent.

Examples of the hydrophilic solvent include alcohols (ethanol, isopropanol, butanol, cyclohexanol, glycol, and the like), and propylene glycol monomethylether (PGME).

Examples of the hydrophobic solvent include ketones (acetone, methyl ethyl, ketone, methyl isobutyl ketone, cyclohexanone, and the like), ethers (dioxane, tetrahydrofuran, and the like), alicyclic hydrocarbons (cyclohexane and the like), halocarbons (dichloromethane, dichloroethane, and the like), esters (methyl acetate, ethyl acetate, butyl acetate, and the like), cellosolves (methyl cellosolve, ethyl cellosolve, and the like), cellosolve acetates, sulfoxides (dimethyl sulfoxide and the like), and amides (dimethylformamide, dimethylacetamide, and the like).

These solvents may be used singly or in combination of two or more.

In the above-described resin composition, the solvent is preferably a mixed solvent containing two or more solvents having different hydrophilicities. Specifically, the solvent is preferably a mixed solvent of the above hydrophilic solvent and the above hydrophobic solvent.

Because such a mixed solvent is used, the hard coat layer can be suitably formed using the later-described formation mechanism.

In the mixed solvent, the composition ratio between the hydrophilic solvent and the hydrophobic solvent is preferably such that the hydrophilic solvent accounts for less than 50% by mass in the mixed solvent. When the hydrophilic solvent accounts for 50% by mass or more, the hard coat layer may be difficult to form by the later-described formation mechanism.

Further, in the mixed solvent, the hydrophilic solvent preferably contains two or more hydrophilic solvents having different boiling points. At least one boiling point of the two or more hydrophilic solvents is preferably higher than the boiling point of the hydrophobic solvent. With the resin composition containing such a mixed solvent, the hard coat layer can be more suitably formed, by the formation mechanism (described later).

Herein, the hydrophobic solvent preferably has a boiling point of about 50 to 120° C., and the hydrophilic solvent having a higher boiling point than the hydrophobic solvent preferably has a boiling point of 75 to 130° C.

Further, in the resin composition, the solvent preferably contains a penetrating solvent that has an ability to penetrate the triacetylcellulose substrate.

In the present invention, the meaning of the "ability to penetrate" of the penetrating solvent includes all the concepts such as ability to penetrate, swell, and wet the triacetylcellulose substrate. Such a penetrating solvent swells or wets the triacetylcellulose substrate, and this allows a portion of the resin composition to penetrate the triacetylcellulose substrate. A high strength can thereby be achieved.

Examples of the penetrating solvent include ketones such as acetone, methyl ethyl ketone, cyclohexanone, and methyl isobutyl ketone; esters such as methyl formate, methyl acetate, ethyl acetate, butyl acetate, propyl acetate, isopropyl acetate, and ethyl lactate; nitrogen-containing compounds such as nitromethane, acetonitrile, N-methylpyrrolidone, and N,N-dimethylformamide; methylglycol acetate; ethers such as tetrahydrofuran, 1,4-dioxane, dioxolan, and diisopropylether; halogenated hydrocarbons such as methylene chloride, chloroform, and tetrachloroethane; glycol ethers such as methyl cellosolve, ethyl cellosolve, butyl cellosolve, and cellosolve acetate; dimethyl sulfoxide; and propylene carbonate, fixtures of these solvents are also included. Of these examples, esters and ketones are preferable. The hydrophobic solvent and the penetrating solvent may be the same solvent. As the solvent that is used as the hydrophobic solvent and the penetrating solvent, ketones and esters, for example, are suitably used.

The penetrating solvent may be mixed with another solvent. Examples thereof include alcohols such as methanol, ethanol, isopropyl alcohol, butanol, isobutyl alcohol, propylene glycol monomethyl ether (PGME), and diacetone alcohol; glycols such as methyl glycol; and aromatic hydrocarbons such as toluene and xylene, with alcohols being preferable examples of the another solvent.

When the penetrating solvent is used in combination with the another solvent, the another solvent is preferably contained in an amount of 10 to 30% by mass relative to the total amount of these solvent.

When the above content is less than 10% by mass, the solubility of the quaternary ammonium salt-containing polymer is reduced, and the storage stability is decreased, which may cause sedimentation, white turbidity, or gelation. When the above-described content is more than 30% by mass, an interference fringe may appear in the optical layered body of the present invention obtained using the above-described resin composition.

As the solvent in the above resin composition, a mixture of several solvents having different solubilities in the binder resin and different drying characteristics is preferable particularly from the viewpoint of the formation of the hard coat layer having excellent antistatic properties, optical characteristics, hardness, and adhesion. Specifically, it is more preferable to use methyl ethyl ketone in combination with, at least one alcohol selected from the group consisting of isopropyl alcohol, normal butanol, isobutanol, and propylene glycol monomethylether (PGME).

Another component can be added to the resin composition, if necessary, as long as it does not adversely affect the effect of the present invention. Examples of the another component include resins other than those mentioned above, photopolymerization initiators, leveling agents, curing agents, polymerization promoters, viscosity adjusters, and refractive index adjusters. Known such agents commonly used in optical layered bodies can be used.

The resin composition can be produced by mixing and dispersing the above-described components. A known method such as a paint shaker, beads mill, or the like may be used for such mixing and dispersing.

The water content in the resin composition is preferably less than 3%. When the water content is 3% or more, it causes gelatin of the resin composition. Consequently, the hard coat layer having sufficient antistatic properties may not be suitably formed, or the quality of the resulting product may be degraded due to the presence of a gel.

Herein, because the quaternary ammonium salt-containing polymer has a high water absorption rate, a resin composition containing such quaternary ammonium, salt-containing polymer usually has a water content of 3% or more.

Because the resin composition contains the quaternary ammonium salt-containing polymer, it is preferable to control the water content to a very low level, i.e., less than 3%.

The method for controlling the water content in the resin composition to less than 3% is not particularly limited. Well-known methods may be used: for example, when preparing the resin composition, the resin composition is produced, in a temperature and humidity-controlled place; and when storing the resin composition, an open system is avoided to prevent absorption of moisture in the air, and the storage is controlled to prevent evaporation of the solvent (condensation on the resin composition due to the heat of evaporation of the solvent is inhibited).

In the optical layered body of the present invention having a hard coat layer provided on a triacetylcellulose substrate, the resin composition is used to form the hard coat layer.

The formation of the hard coat layer provided on the triacetylcellulose substrate using the resin composition is specifically carried out by a method wherein the resin composition is applied to the triacetylcellulose substrate to form a coating film, and the coating film is dried and then cured.

Examples of the methods for applying the resin composition to the triacetylcellulose substrate include known application methods such as roll coating, Mayer bar coating gravure coating, and dye coating.

The coating amount is preferably 3 to 28 $g/m^2$ based on the solids content (film thickness of 2 to 20 μm). When the amount is less than 3 $g/m^2$ (film thickness of 2 μm), the hardness may be decreased and desired antistatic properties may not be obtained. When the coating amount exceeds 28 $g/m^2$ (20 μm), curling may easily occur. The coating amount is more preferably 4 to 11 $g/m^2$ (film thickness of 5 to 15 μm) and still more preferably 7 to 9 $g/m^2$ (film thickness of 10 to 12 μm).

The coating film is preferably dried under the following drying conditions: temperature of 30 to 110 °C. for a period from 30 seconds to 5 minutes. In view of the deformation of the substrate caused by the heat and production efficiency, the drying is more preferably performed at a temperature of 40 to 90° C. for a period from 30 seconds to 2 minutes.

The curing method is not particularly limited. A known method may be employed according to the resin components constituting the binder resin. Examples include a method in which curing and the like are performed by the irradiation of active energy rays such as ultraviolet light.

Because the hard coat layer is formed using the above resin composition, the optical layered body produced in the present invention, can be provided with excellent antistatic properties, optical characteristics, hardness, and adhesion of the hard coat layer to a functional layer provided on the hard coat layer.

A formation mechanism of the hard coat layer achieved by the above resin, composition that can provide such effects is presumed as follows. An example of the formation mechanism of the hard coat layer with the use of the resin composition is explained below.

The triacetylcellulose substrate to which the resin composition is applied to form a coating film has a higher hydrophilicity than a substrate formed from other plastic-based resins (for example, substrates formed from PET, COP, PP, acrylic, polycarbonate, and the like). Therefore, the triacetylcellulose substrate has a good compatibility with hydrophilic monomers and hydrophilic polymers.

In the present invention, the above-described oligomer (hydrophilic oligomer) and monomer (hydrophilic monomer) having different hydrophilicities are used as the two or more resin, components having different hydrophilicities contained in the resin composition, and the hydrophilicity of the hydrophilic monomer is rendered higher than that of the hydrophilic oligomer. Consequently, coupled with the fact that the hydrophilic monomer has a lower weight-average molecular weight, the penetration of the hydrophilic monomer into the triacetylcellulose substrate tends to easily occur when the coating film is formed. As a result, inevitably, the percentage of the presence of the oligomer is higher in the unpenetrated portion of the coating film.

Additionally, because the quaternary ammonium salt-containing polymer containing the above resin composition preferably has a weight-average molecular weight of 1,000 to 50,000, the quaternary ammonium salt-containing polymer also does not easily penetrate the triacetylcellulose substrate.

Accordingly, the percentages of the presence of both hydrophilic oligomer and quaternary ammonium salt-containing polymer are high in the unpenetrated portion of the coating film, and the quaternary ammonium salt-containing polymer is present near the surface of the hard coat layer formed. This results in good antistatic properties.

The reason therefore is assumed to be as follows: the hydrophilicity decreases in the order of quaternary ammonium salt-containing polymer, hydrophilic monomer, and hydrophilic oligomer; and when the coating film is formed, as the hydrophilic monomer penetrates the triacetylcellulose substrate, the quaternary ammonium salt-containing polymer and the hydrophilic oligomer, which have very different hydrophilicities, are present in the unpenetrated portion. When such a coating film is cured to form a hard coat layer, the quaternary ammonium salt-containing polymer is localised near the surface of the hard coat layer, and phase separation in a sea-island structure (three-dimensional net-like structure) occurs, thus forming a conductive path.

The localisation of the quaternary ammonium salt-containing polymer is described in detail later.

Herein, when the percentage of the hydrophilic monomer in the unpenetrated portion of the coating film is high, the quaternary ammonium salt-containing polymer and the hydrophilic monomer are mixed well, causing the quaternary ammonium salt-containing polymer to be excessively dispersed in the unpenetrated portion. As a result, antistatic properties cannot be imparted to the hard coat layer formed.

On the other hand, when the resin composition contains only the quaternary ammonium salt-containing polymer and the hydrophilic oligomer and does not contain the hydrophilic monomer, phase separation occurs, between the quaternary ammonium salt-containing polymer and the hydrophilic oligomer in the resin composition, and gelation occurs at a stage prior to coating. In other words, in the resin composition prior to coating, the hydrophilic monomer works as an intermediate between the quaternary ammonium salt-containing polymer and the hydrophilic oligomer, and is considered to contribute to improve the solubility of the quaternary ammonium salt-containing polymer and the hydrophilic oligomer.

In the present invention, the resin composition is applied to the triacetylcellulose substrate to form a coating film, thereby causing the penetration, of the hydrophilic monomer serving as an intermediate into the triacetylcellulose substrate, and allowing the quaternary ammonium salt-containing polymer and the hydrophilic oligomer, which have slightly poorer solubility than the hydrophilic monomer in the triacetylcellulose substrate, to be present in the unpenetrated portion of the coating film. In this way, in the present invention, the percentage of the quaternary ammonium salt-containing polymer in the unpenetrated portion of the coating film is apparently high, and sufficient antistatic properties can be imparted to the hard coat layer formed even with a small amount of quaternary ammonium salt-containing polymer.

Note that when the coating film is formed by applying the resin composition to a substrate in which no penetration of the hydrophilic monomer occurs, the quaternary ammonium salt-containing polymer, the hydrophilic monomer, and the hydrophilic oligomer are simply mixed. The quaternary ammonium salt-containing polymer is in a good dispersion state (dissolution state), and the percentage of the presence (amount) of the quaternary ammonium salt-containing polymer near the surface of the hard coat layer formed is low. Therefore, sufficient antistatic properties cannot be imparted to the hard coat layer that is formed.

Additionally, when a di- or more functional hydrophilic acrylate monomer is used as the hydrophilic monomer and a hydrophilic multifunctional acrylate oligomer is used as the hydrophilic oligomer, the di- or more functional hydrophilic acrylate monomer penetrates the triacetylcellulose substrate, and a blended layer in which a composition constituting the triacetylcellulose substrate is mixed with the di- or more functional hydrophilic acrylate monomer is formed. As a result, the interference fringe disappears, and an optical layered body with a good visibility is obtained. Further, because the di- or more functional hydrophilic acrylate monomer undergoes a crosslinking reaction in the presence of ultraviolet light, the optical layered body has an excellent adhesion.

Further, because the hydrophilic multifunctional acrylate oligomer is present in the unpenetrated portion of the coating film, a good adhesion to another layer laminated on the upper layer is also achieved. Additionally, because the multifunctional acrylate oligomer itself has an excellent hardness, the hardness of the optical layered body is also rendered excellent.

An example of the formation mechanism, of the hard coat layer, which uses the resin composition, is further specifically described below with reference to FIG. 1.

FIG. 1 is an example of a cross-sectional schematic diagram showing the formation mechanism of the hard coat layer formed using a resin composition containing two solvents, i.e., methyl ethyl ketone and normal butanol, a quaternary ammonium salt-containing polymer, and two resin components having different hydrophilicities.

When the resin composition is applied to a triacetylcellulose substrate 1 to form a coating film (resin composition 2), methyl ethyl ketone as a penetrating solvent partially penetrates the triacetylcellulose substrate 1, and a relatively low-molecular weight and highly hydrophilic resin component having a high compatibility with methyl ethyl ketone partially penetrates the triacetylcellulose substrate (a penetration portion 4) (FIGS. 1(*a*) and 1(*b*). On the other hand, a high-molecular weight quaternary ammonium salt-containing polymer 3 and a high-molecular weight resin component with a low hydrophilicity remain on the triacetylcellulose substrate (an unpenetrated portion 5).

Although the hydrophilicity of the solvent contained in the unpenetrated portion 5 changes along with the penetration of methyl ethyl ketone into the triacetylcellulose substrate and evaporation of methyl ethyl ketone in the unpenetrated portion 5, the quaternary ammonium salt-containing polymer 3 and the resin component with a low hydrophilicity are suitably dispersed (dissolved) because of the presence of normal butanol.

Subsequently, normal butanol begins to evaporate, and thus the hydrophilicity of the solvent contained in the unpenetrated portion 5 further changes. In response thereto, the resin component with a high hydrophilicity and the resin component with a low hydrophilicity are deposited, and the quaternary ammonium salt-containing polymer 3 having a high compatibility with normal butanol moves to the upper layer of the unpenetrated portion 5.

Further, along with the evaporation of normal butanol, the quaternary ammonium salt-containing polymer 3 further moves to the upper layer and will be localized near the upper surface of the unpenetrated portion 5. Then, as methyl ethyl ketone in the penetration portion 4 evaporates, localisation of the quaternary ammonium salt-containing polymer 3 near the upper surface of the unpenetrated portion 5 is promoted (FIG. 1 (b)). In this way, the quaternary ammonium salt-containing polymer has an effect of providing antistatic properties even when the amount thereof is small.

Herein, when the hydrophobicity of the resin composition (the unpenetrated portion 5) is too high, the quaternary ammonium salt-containing polymer 3 appears on the surface of the unpenetrated portion 5 and is coagulated thereon. Therefore, when this composition is cured to form a hard coat layer, the haze may be increased and the external appearance may become white. Adhesion to function layers such as a low-refractive index layer formed on the hard coat layer will also be decreased.

Additionally, when the binder resin of the resin composition contains the above-described two or more resin components having different hydrophilicities, it is possible to alleviate the conditions for the formation of the hard coat layer in which the quaternary ammonium salt-containing polymer is localised in a desired range. As a result, the hard coat layer having a structure in which the quaternary ammonium, salt-containing polymer is localised as described above can be more easily formed.

In the present invention having such a formation mechanism of the hard coat layer, it is preferable to use a solvent having a high ability to penetrate the triacetylcellulose substrate and a solvent having a low ability to penetrate in combination as the solvents contained in the resin composition. Preferably, the solvent with a high ability to penetrate is a highly hydrophobic solvent having a fast drying rate. Preferably, the solvent with a low ability to penetrate is a highly hydrophilic solvent with a slow drying rate.

Examples of the hydrophobic solvent include methyl ethyl ketone, methyl acetate, ethyl acetate, and propyl acetate. Further, examples of the hydrophilic solvent include isopropyl alcohol, n-butanol, s-butanol, t-butanol, benzyl alcohol, and PGME.

As described above, in the present invention, the balance of hydrophilicity (compatibility) among the quaternary ammonium salt-containing polymer as an antistatic agent, the binder resin, and the solvents is suitably controlled. Thereby, the hard coat layer in which the quaternary ammonium salt-containing polymer as an antistatic agent is localised in a desired range can be formed.

Consequently, the resin composition can suitably impart antistatic properties to the optical layered body produced by adding a small amount of antistatic agent. Further, because only a small amount is added, neither the transparency of the optical layered body produced in the present invention nor the film strength of the hard coat layer formed is reduced. The resin composition can also provide an excellent adhesion between the hard coat layer and function layers such as low-refractive index layer and the like formed thereon.

In this way, the above resin composition makes it possible to form a hard coat layer consisting of a single layer, which has excellent antistatic properties, optical characteristics, hardness, and adhesion. Therefore, the optical layered body of the present invention having the above-described various properties can be produced at a low cost.

The optical layered body of the present invention having the hard coat layer formed by the above resin composition may further be provided with a low-refractive index layer. FIG. 1 (c) is a cross-sectional view schematically showing an example of the optical layered body of the present invention having a low-refractive index layer. A hard coat layer 6 is formed on the triacetylcellulose substrate 1, and a low-refractive index layer 8 is formed on the hard coat layer 6, on the side opposite to the triacetylcellulose substrate 1. Additionally, a blended layer 7 explained above in the description of the formation mechanism that uses the resin composition is formed in the triacetylcellulose substrate 1, near the interface with the hard coat layer 6.

The low-refractive index layer is a layer having a lower refractive index than the hard coat layer, and formed from a cured body of a composition for the low-refractive index layer. In order to make the refractive index of the low-refractive index layer lower than that of the hard coat layer, known low-refractive index curable resin and fine particles can be suitably contained in the composition for the low-refractive index layer.

An optical layered body having an excellent antireflection properties is achieved because such a low-refractive index layer is provided thereto.

In a preferable embodiment of the optical layered body of the present invention, the refractive index of the hard coat layer is preferably 1.47 to 1.60 after curing, and the refractive index of the low-refractive index layer is preferably 1.40 or less, and more preferably 1.36 or less after curing.

The low-refractive index layer is preferably formed on the outermost surface.

The low-refractive index layer is not particularly limited as long as it is a known low-refractive index layer. For example, the low-refractive index layer can be formed using a composition for the low-refractive index layer, which contains a low-refractive index agent, a binder resin, and a solvent.

The low-refractive index agent is not particularly limited, and a known agent can be used. In particular, porous fine particles are preferable and hollow silica is more preferable in view of the fact that the refractive index is low and the hardness of the resulting low-refractive index layer is high.

Examples of the hollow silica include silica fine particles obtained by a production method disclosed in Japanese Kokai Publication 2001-233611, Japanese Kokai Publication H07-133105, Japanese Kokai Publication 2002-79616, Japanese Kokai Publication 2006-106714, or the like.

A commercially available product may be used as the hollow silica. Examples of the commercially available hollow silica include Nipsil and Nipgel (trade names) produced by Nippon Silica Industrial Co., Ltd.; and Colloidal Silica UP series (trade name) produced by Nissan Chemical Industries, Ltd.

The hollow silica is preferably contained in an amount of 50 to 170 parts by mass relative to 100 parte by mass of the resin solids content in the composition for the low-refractive index layer. When the content is less than 50 parts by mass, it may not be possible to form a layer having a desired refractive index. When the content exceeds 170 parts by mass, the hardness and the transparency may be decreased and the haze may be increased. The hollow silica content is more preferably 70 to 150 parts by mass.

Examples of the binder resin include ionizing radiation-curable resin, which is cured by ultraviolet light or electron beam; mixtures of the ionizing radiation-curable resin and solvent drying-type resin (i.e., resin such as thermoplastic resin, that can be formed into a coating film simply by drying a solvent added to adjust the solids content during coating); and thermosetting resin. Ionizing radiation-curable resin is more preferable. As used herein, the term, "resin" is a concept that includes resin components such as monomers and oligomers.

Examples of the ionizing radiation-curable resin include compounds having one or more unsaturated bonds, such as acrylate-based compound. A known compound can be used as the acrylate-based compound.

Additionally, it is preferable that the binder resin is suitably selected and used according to the hydrophilicity and hydrophobicity of the above-described hard coat layer.

Further, in order to decrease the refractive index, a resin containing a fluorine atom in the molecule may be used as the binder resin used in the low-refractive index layer. The fluorine atom-containing resin may be a monomer, an oligomer, or a polymer, and is preferably a compound having at least one or more (meth)acryloyl groups in the molecule.

The fluorine atom-containing resin may be used in combination with the above-described hollow silica.

Examples of the solvent include alcohols (e.g., methanol, ethanol, propanol, isopropyl alcohol (IPA), n-butanol, s-butanol, t-butanol, benzyl alcohol, and PGME), ketones (e.g., acetone, methyl ethyl ketone, methyl isobutyl ketone, cyclohexanone, heptanone, diisobutyl ketone, and diethyl ketone), esters (e.g., methyl acetate, ethyl acetate, propyl acetate, butyl acetate, methyl formate, ethyl, formate, propyl formate, butyl formate, and PGMEA), aliphatic hydrocarbons (e.g., hexane and cyclohexane), halogenated hydrocarbons (e.g., methylene chloride, chloroform, and carbon tetrachloride), aromatic hydrocarbons (e.g., benzene, toluene, and xylene), amides (e.g., dimethylformamide, dimethylacetamide, and n-methylpyrrolidone), ethers (e.g., diethyl ether, dioxane, and tetrahydrofuran), and ether alcohols (e.g., 1-methoxy-2-propanol).

The composition for the low-refractive index layer may contain other components, if necessary, in addition to the low-refractive index agent, the binder resin, and the solvent. Examples of the other components are the same as those that can be used in the above-described resin composition.

The composition for the low-refractive index layer can be obtained by mixing and dispersing the components described above.

A known method can be used as the method for such mixing and dispersing.

In addition to the triacetylcellulose substrate, the hard coat layer, and the low-refractive index layer, the optical layered body of the present invention may also include another function layer, if necessary.

Examples of the another function layer include a high-refractive index layer, an intermediate-refractive index layer, and an antifouling layer. These function layers can be formed by a known method using known materials. The same materials used in the hard coat layer can be used as the materials such as binders and solvents that constitute these other function layers. A good adhesion can be provided to the hard coat layer by the use of such materials. It is preferable to consider the hydrophilicity and the hydrophobicity of the hard coat layer when selecting materials constituting the other function layers.

The optical layered body of the present invention preferably has a surface resistance value of $1 \times 10^{11}$ Ω/□ or less and a haze of 0.7% or less.

When the surface resistance value exceeds $1 \times 10^{11}$ Ω/□, the antistatic properties may not be sufficiently obtained.

The surface resistance value is a value measured at an applied voltage of 500 V using a surface resistivity meter (produced by Mitsubishi Chemical Corporation; product number; Hiresta IP MCP-HT260).

Further, when the haze of the optical layered body of the present invention exceeds 0.7%, desired optical characteristics cannot be obtained, and the optical layered body of the present invention may have a reduced visibility when mounted on the surface of an image display.

The haze is a value measured in accordance with JIS K-7136 using a base meter (produced by Murakami Color Research Laboratory; product number: HM-150).

The optical layered body of the present invention preferably has a total light transmittance of 30% or more. When it is less than 90%, the color reproducibility and the visibility may be impaired when the optical layered body is mounted on the display surface. The total light transmittance is more preferably 92% or more.

The total light transmittance can be measured by a method in accordance with JIS K-7361 using a base meter (produced by Murakami Color Research Laboratory; product number: HM-150).

Further, the optical layered body of the present invention is preferably H or harder, more preferably 2H or harder, and still more preferably 3H or harder, in the pencil hardness test (load; 4.9 N) specified by JIS K 5600-5-4 (1999). When, the optical layered body of the present invention is used on the outermost surface of an image display device, the hardness is preferably 2H or harder, more preferably 3H or harder.

Examples of the method for producing the optical layered body of the present invention include a method in which a hard coat layer is formed by applying the above-described resin composition to a triacetylcellulose substrate.

The triacetylcellulose substrate and the hard coat layer are the same as those described above. Further, examples of the method for forming the hard coat layer using the resin composition include the same method described above.

The optical layered body can also be provided with anti-glare properties by adding an anti-glare material to the binder resin in the resin, composition for forming the hard coat layer. As the anti-glare material to be added, any fine particles such as organic resin fine particles and inorganic fine particles can be used. Further, instead of adding an anti-glare material, the hard coat layer having anti-glare properties can also be obtained by phase separation of the binder resin, while taking into account the balance between the hydrophilicity and hydrophobicity of the binder resin.

The total haze of the optical layered body of the present invention having anti-glare properties, i.e., the total haze including haze due to surface roughness and haze due to internal scattering and the like, is 0.3 to 50%. The maximum total hare is preferably 22% or less in order to obtain an optical layered body having anti-glare properties with improved color tone and definition of still images and moving images.

The optical layered body of the present invention can provide a polarizer by disposing the optical layered body on the surface of a polarizing element in such a manner that the polarizing element is on the side across the triacetylcellulose substrate.

The polarizing element is not particularly limited. For example, polyvinyl alcohol film, polyvinyl formal film, polyvinyl acetal film, ethylene-vinyl acetate copolymer-based saponified film, and the like which are stretched and dyed with iodine or the like can be used. In lamination of the polarizing element and the optical layered body, the triacetylcellulose substrate is preferably saponified. A good adhesion and an antistatic effect can be obtained by saponification treatment.

The present invention also encompasses an image display device including the optical layered body or the polarizer on the outermost surface. The image display device may be a non-self-luminous image display device such as an LCD or a self-luminous image display device such as a PDP, FED, ELD (organic EL or inorganic EL), CRT, or the like.

The LCD, which is a typical example of the non-self-luminous image display device, includes a light-transmitting display and a light source device that irradiates the transmitting device from behind. When the image display device of the present invention is an LCD, the optical layered body or the polarizer is formed on the surface of the light-transmitting display.

When the present invention is a liquid crystal display device having the optical layered body, the optical layered body is irradiated from below with a light source of the light source device. In the case of an STN liquid crystal display device, a retarder may be inserted between the liquid crystal display element and the polarizer. An adhesive layer may be provided, if necessary, between each layer of the liquid crystal display device.

The PDP, which is the self-luminous image display device, includes a front glass substrate (electrodes are formed on the surface) and a rear glass substrate (electrodes and microscopic grooves are formed on the surface, and red, green, and blue phosphor layers are formed in the grooves) disposed to face the front glass substrate with a discharge gas enclosed between these substrates. When the image display device of the present invention is a PDP, the PDP includes the optical layered body disposed on the surface of the front glass substrate or a plate (a glass substrate or a film substrate) in front of the front glass substrate.

The self-luminous image display device may be an image display device such as an ELD apparatus in which phosphors such as zinc sulfide or diamine-based substances that emit light when applied with a voltage are layered on a glass substrate, and the voltage applied to the substrate is controlled to perform display; or a CRT that converts electrical signals into light and produces images visible to human eyes. In this case, the image display device includes the above-described optical layered body on the outermost surface of each display device or on the surface of a plate in front of the display device.

In any of the cases, the optical layered body of the present invention can be need for displays such as televisions, computers, and touch panels. In particular, the optical layered body can be suitably used in the surface of displays for high-definition, images, such as CRTs, liquid crystal panels, PDPs, ELDs, and FEDs.

Advantageous Effects of Invention

Because the optical layered body of the present invention has a hard coat layer formed by using the resin composition described above, the optical layered body is excellent in antistatic properties, optical characteristics, hardness, adhesion, and interference fringe prevention performance. Therefore, the optical layered body of the present invention is suitably applicable to cathode-ray tube (CRT) display devices, liquid crystal displays (LCDs), plasma display panels (PDPs), electroluminescence displays (ELDs), field emission displays (FEDs), touch panels, electronic paper, and the like.

BRIEF DESCRIPTION OF DRAWINGS

FIGS. 1(a) and 1(b) each show an example of a cross-sectional schematic diagram showing a formation mechanism of a hard coat layer in the optical layered body of the present invention, which is produced using the resin composition of the present invention.

DESCRIPTION OF EMBODIMENTS

Figure 1:
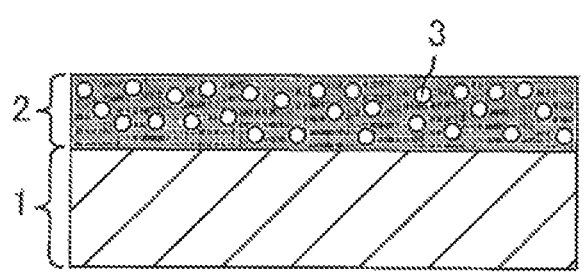
FIG. 1 (c) is a cross-sectional view schematically showing the optical layered body of the present invention provided with a low-refractive index layer.
Figure 1:
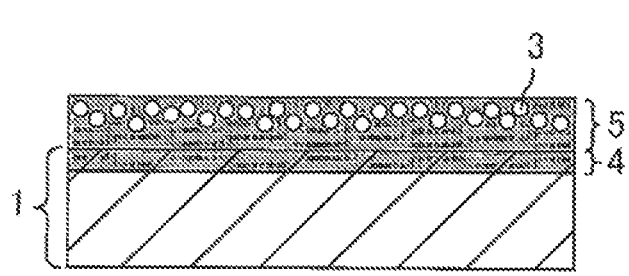
Figure 1:
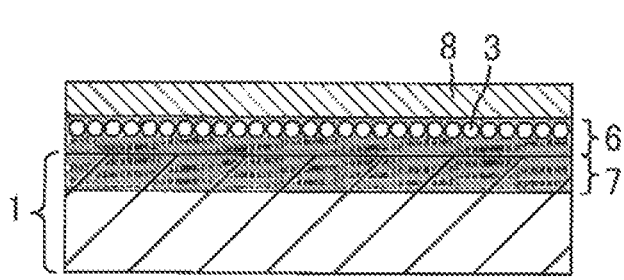

The present invention is described with reference to the following examples; however, the present invention should not be interpreted by limiting to these examples. Additionally, "parts" and "%" are mass basis unless otherwise specified.

EXAMPLE 1

The following composition, was formulated to prepare a resin composition.
Quaternary ammonium salt-containing polymer A (ACRIT 1SX-3000, weight-average molecular weight (Mw) of 10,000 to 40,000, produced by Taisei Fine Chemical Co., Ltd,): 3 parts by mass in terms of solids content
Dipentaerythritol hexaacrylate (DPHA) (hexa-functional, weight-average molecular weight (Mw) of 524, produced by Nippon Kayaku Co., Ltd,): 27 parts by mass
BS577 (Beamset 577, urethane acrylate, Mw of 1,000, produced by Arakawa Chemical industries, Ltd,): 70 parts by mass
Photopolymerization initiator (Irgacure 184, produced by Ciba Japan K.K.); 4 parts by mass
Methyl ethyl ketone (MEK); 85 parts by mass
N-butanol: 15 parts by mass The thus-obtained resin composition was applied to a triacetylcellulose (TAC) substrate (thickness of 80 μm, TD80ULN (trade name), produced by FUJIFILM Corporation) in an coating amount (dry) of 15 g/m$^2$ (dry film thickness of 12 μm), and dried at 70° for 60 seconds to form a coating film. Subsequently, 200 mJ/cm$^2$ of ultraviolet light was applied to the coating film to cure the same so as to form a hard coat layer, thereby obtaining an optical layered body.

EXAMPLES 2 TO 10 AND 12 TO 15; COMPARATIVE EXAMPLES 1 To 6; AND REFERENCE EXAMPLES 1 TO 10

Each optical layered body was produced in the same manner as in Example 1, except that the components of the resin composition for the hard coat layer were changed as shown in Table 1 and the substrate was changed as shown in Table 2.

Note that quaternary ammonium salt-containing polymers, resins, substrates, and the like, which are shown in Table 1 but not mentioned above, are specifically as described below.

Additionally, the numerical values in the columns under "Parts by mass" of the binder resins in Table 1 indicate the proportion of each resin in the mixture.

>Quaternary Ammonium Salt-Containing Polymer<
B: H6S00 (about 10% of the solids content is quaternary ammonium salt-containing polymer, and about 90% is DPHA), Mw of 10,000, produced by Mitsubishi Chemical Corporation, 50% solids content (solvent MEK, alcohol.)
C: quaternary ammonium salt-containing polymer of H6500, with Mw of 22,000
D: quaternary ammonium salt-containing polymer of H6500, with Mw of 4,500

>Binder Resin<
PETA: pentaerythritol triacrylate, Mw of 298
UV1700B: Seiko UV1700B, urethane aerylate, Mw of 2,000, produced by Nippon Synthetic Chemical Industry Co., Ltd.
DPHA40H: DPHA40H, urethane acrylate, Mw of 7000, produced by Nippon Kayaku Co., Ltd,.
HOP; Light Ester HOP, mono-functional monomer, Mw of 144, produced by Kyoeisha Chemical Co., Ltd.
DCPA: Light Ester DCPA, di-functional monomer, Mw of 303, produced by Kyoeisha Chemical Co., Ltd.
M9050; a mixed resin of polyester ethylene oxide (EO)-modified triacrylate and isocyanuric acid EO-modified triacrylate, Mw of about 420, produced by Toagosei Co., Ltd.
M8030: polyester triacrylate, Mw of about 400, produced by Toagosei Co., Ltd., tri-functional
UN904: Artresin UN904, arethane acrylate, Mw of 4,900, produced by Negami Chemical Industrial Co., Ltd., deca-functional
V802: V802, nona-functional monomer, Mw of 1,000, produced by Osaka Organic Chemical Industry Ltd.
EBECRYL 8210: urethane acrylate, Mw of 600, functional group number of 4, produced by DAICEL-CYTEC Company, Ltd.
UX-3204; urethane acrylate, Mw of 13,000, functional group number of 2, produced by Nippon Kayaku Co., Ltd.
EBECRYL 885: polyester acrylate, Mw of 6,000, functional group number of 5, produced by DAICEL-CYTEC Company, Ltd.

>Substrate<
PET substrate: A4300 produced by Toyobo Co., Ltd., thickness of 188 μm

EXAMPLE 11

In the same manner as in Example 1, a hard coat layer was formed, on a triacetylcellulose (TAC) substrate, and subsequently, a composition for a low-refractive index layer having the following composition was applied to the hard coat layer to form a coating film (dry film thickness of 100 nm), dried in a thermal oven at a temperature of 70° C. for 60 seconds to evaporate solvents in the coating film. Then, ultraviolet light was applied thereto in such a manner that the cumulative amount of light would be 200 mJ to cure the coating film. Thereby, a low-refractive index layer was further formed and an optical layered body was obtained.

>Composition for the Low-Refractive Index Layer<
Hollow silica fine particles (solids content of the silica fine particles; 20% by mass solution; methyl isobutyl ketone; average particle size of 50 nm): 73 parts by mass Fluorine atom-containing polymer (produced by JSR Corporation; Opster TU2224; 20% solids content; methyl isobutyl ketone as the solvent): 2 parts by mass in terms of solids content
Fluorine atom-containing monomer (produced by Kyoeisha Chemical Co. Ltd.; LINC3A; refractive index of 1.42; 100% solids content): 5 parts by mass
Pentaerythritol triacrylate (PETA): 3 parts by mass Polymerization initiator (Irgacure 127, produced by Ciba Japan K.K.): 0.35 parts by mass
Silicone/fluorine-containing antifouling agent (TU2225, produced by JSR Corporation) 0.5 parts by mass in terms of solids content
Methyl isobutyl ketone (MIBK): 320 parts by mass
Propylene glycol monomethyl ether (PGME): 161 parts by mass (Hydrophilicity)

The above-described quaternary ammonium salt-containing polymers and binder resins were individually used and cared on the PET substrate to a dry film thickness of 7 μm (irradiation amount of ultraviolet light: 200 mJ/cm$^2$) to form a coating film, and the water contact angle of the coating film was measured by CA-X model produced by Kyowa Interface Science Co., Ltd. The results are shown below:

DPHA: 74 degrees
PETA: 68 degrees
M9050: 75 degrees
BS577: 72 degrees
M8030: 76 degrees
UV1700B: 83 degrees
UN904: 80 degrees
DPHA40H: 80 degrees
DCPA: 70 degrees
HOP: 65 degrees
V802: 74 degrees
EBECRYL 8210: 71 degrees
UX-3204: 80 degrees
EBECRYL 885: 72 degrees
Quaternary ammonium salt-containing polymer: 70 degrees The thus-obtained optical layered body was evaluated in terms of the following items. Table 2 shows the results.

(Surface Resistance)

The surface resistance value (Ω/□) was measured at an applied voltage of 500 V using a surface resistivity meter (produced by Mitsubishi Chemical Corporation; product number; Hiresta IP MCP-HT260).

(Presence or Absence of Interference Fringe)

A black tape for preventing back reflection was attached to the optical layered body, on the side opposite to the hard coat layer. The optical layered body was visually observed from the hard coat layer side, and occurrence of an interference fringe was evaluated.

An interference fringe was graded as "absent" when there was no interference fringe and the visibility was good, or as "present" when an interference fringe was formed.

(Haze)

The haze value (%) was measured in accordance with JIS K-7136 using a haze meter (produced by Murakami Color Research laboratory; product number: HM-150).

(Adhesion)

In accordance with JIS K-5600, 100 cross-cuts (1×1 mm square) were made on the hard coat layer of the optical layered body, and a peeling test was performed 5 times in succession using Cello-tape (registered trade mark) with a width of 24 mm, produced by Nichiban Co., Ltd. The number of retaining cross-cuts was counted. When all the cross-cuts remained without any peeling, the result was rated good. When at least one cross-cut was peeled, the result was rated poor.
(Transmittance)

The total light transmittance was measured in accordance with JIS R-7361 using a base meter (produced by Murakami Color Research Laboratory; product number: HM-150).
(Pencil Hardness)

The optical layered body was subjected to humidity conditioning at a temperature of 25° C. and a relative humidity of 50% for 2 hours. Subsequently, with a use of test pencils (hardness of H to 3H) specified in JIS S-6006, the pencil hardness test was performed under a load of 4.9 N in accordance with a pencil hardness evaluation method specified in JIS K 5600-5-4 (1999). Each optical layered body was scratched 5 times, and the pencil hardness with which the number of scratch marks was less than 4 was defined as the hardness in the test.

TABLE 1

| | Quaternary ammonium salt-containing | | Binder resin Monomer component | | | | Binder resin Oligomer component | | | | Solvent (parts by mass) | | Photopolymerization initiator (parts by mass) | Water content (%) in the resin composition |
|---|---|---|---|---|---|---|---|---|---|---|---|---|---|---|
| | Type | Parts by mass | Type | Hydrophilicity Contact angle (degree) | Mw | Parts by mass | Type | Hydrophilicity Contact angle (degree) | Mw | Parts by mass | MEK | n-Butanol | | |
| Example 1 | A | 3 | DPHA | 74 | 534 | 27 | BS577 | 72 | 1000 | 70 | 85 | 15 | 4 | 1 |
| Example 2 | A | 3 | DPHA | 74 | 534 | 27 | UV1700B | 83 | 2000 | 70 | 85 | 15 | 4 | 1 |
| Example 3 | A | 3 | DPHA/M9050 | 74.5 | 534/420 | 27/40 | BS577 | 72 | 1000 | 30 | 85 | 15 | 4 | 1 |
| Example 4 | A | 3 | DPHA/M9050 | 75 | 534/400 | 27/40 | BS577 | 72 | 1000 | 30 | 85 | 15 | 4 | 1 |
| Example 5 | A | 1.5 | DPHA | 74 | 534 | 13.5 | BS577 | 72 | 1000 | 85 | 85 | 15 | 4 | 1 |
| Example 6 | A | 8 | DPHA | 74 | 534 | 72 | BS577 | 72 | 1000 | 20 | 85 | 15 | 4 | 1 |
| Example 7 | B | 3 | DPHA | 74 | 534 | 27 | BS577 | 72 | 1000 | 70 | 85 | 15 | 4 | 1 |
| Example 8 | A | 3 | DPHA | 74 | 534 | 27 | BS577 | 72 | 1000 | 70 | 85 | 15 | 4 | 2.5 |
| Example 9 | A | 3 | DPHA | 74 | 534 | 27 | BS577 | 72 | 1000 | 70 | 85 | 15 | 4 | 0.1 |
| Example 10 | A | 3 | DCPA | 76 | 303 | 27 | BS577 | 72 | 1000 | 70 | 85 | 15 | 4 | 1 |
| Example 11 | A | 3 | DPHA | 74 | 534 | 27 | BS577 | 72 | 1000 | 70 | 85 | 15 | 4 | 1 |
| Example 12 | A | 3 | DPHA | 74 | 534 | 27 | BS577 | 72 | 1000 | 70 | 55 | 45 | 4 | 1 |
| Example 13 | A | 3 | DPHA | 74 | 534 | 27 | BS577 | 72 | 1000 | 70 | 70 | 30 | 4 | 1 |
| Example 14 | A | 3 | DPHA | 74 | 534 | 27 | BS577 | 72 | 1000 | 70 | 85 (*1) | 15 | 4 | 1 |
| Example 15 | B | 3 | DPHA | 74 | 534 | 27 | BS577 | 72 | 1000 | 70 | 70 | 30 | 4 | 1 |
| Comparative Example 1 | A | 3 | PETA | 69 | 298 | 23 | — | — | — | — | 85 | 15 | 4 | 1 |
| Comparative Example 2 | B | 3 | — | — | — | — | BS577 | 72 | 1000 | 97 | 85 | 15 | 4 | 1 |
| Comparative Example 3 | — | — | DPHA | 74 | 534 | 30 | BS577 | 72 | 1000 | 70 | 85 | 15 | 4 | 1 |
| Comparative Example 4 | A | 3 | DPHA | 74 | 534 | 27 | BS577 | 72 | 1000 | 70 | 85 | 15 | 4 | 1 |
| Comparative Example 5 | A | 3 | PETA | 88 | 298 | 27 | HOP | 65 | 144 | 70 | 85 | 15 | 4 | 1 |
| Comparative Example 6 | B | 3 | — | — | — | — | UN904/DPHA40H | 80 | 4900/7000 | 50/47 | 85 | 15 | 4 | 1 |
| Reference Example 1 | A | 3 | DPHA | 74 | 534 | 27 | BS577 | 72 | | 70 | 85 | 15 | 4 | 5 |
| Reference Example 2 | B | 3 | DPHA | 74 | 534 | 27 | BS577 | 72 | 1000 | 70 | 45 | 55 | 4 | 1 |
| Reference Example 3 | A | 3 | DPHA | 74 | 534 | 27 | BS577 | 72 | 1000 | 70 | 100 | 0 | 4 | 1 |
| Reference Example 4 | A | 3 | DPHA | 74 | 534 | 27 | BS577 | 72 | 1000 | 70 | 0 | 100 | 4 | 1 |
| Reference Example 5 | C | 3 | DPHA | 74 | 534 | 27 | BS577 | 72 | 1000 | 70 | 85 | 15 | 4 | 1 |
| Reference Example 6 | D | 3 | DPHA | 74 | 534 | 27 | BS577 | 72 | 1000 | 70 | 85 | 15 | 4 | 1 |
| Reference Example 7 | A | 3 | V802 | 74 | 1000 | 27 | BS577 | 72 | 1000 | 70 | 70 | 30 | 4 | 1 |
| Reference Example 8 | A | 3 | DPHA | 74 | 534 | 27 | EBECRYL 8210 | 71 | 600 | 70 | 85 | 15 | 4 | 1 |
| Reference Example 9 | A | 3 | DPHA | 74 | 534 | 27 | UX-2204 | 80 | 13000 | 70 | 85 | 15 | 4 | 1 |
| Reference Example 10 | A | 3 | DPHA | 74 | 534 | 27 | EBECRYL 885 | 72 | 6000 | 70 | 85 | 15 | 4 | 1 |

(*1): Content of ethyl acetate

TABLE 2

| | Substrate | Surface resistance value (Ω/□) | Interference pattern | Haze (%) | Adhesion | Pencil hardness | Transmittance (%) |
|---|---|---|---|---|---|---|---|
| Example 1 | TAC | $2 \times 10^9$ | Absent | 0.3 | Good | 3H | 92 |
| Example 2 | TAC | $2 \times 10^9$ | Absent | 0.3 | Good | 3H | 92 |
| Example 3 | TAC | $2 \times 10^9$ | Absent | 0.3 | Good | 3H | 92 |
| Example 4 | TAC | $1 \times 10^8$ | Absent | 0.3 | Good | 3H | 92 |
| Example 5 | TAC | $9 \times 10^9$ | Absent | 0.3 | Good | 3H | 92 |
| Example 6 | TAC | $5 \times 10^8$ | Absent | 0.3 | Good | 3H | 92 |
| Example 7 | TAC | $8 \times 10^9$ | Absent | 0.3 | Good | 3H | 92 |
| Example 8 | TAC | $9 \times 10^8$ | Absent | 0.3 | Good | 3H | 92 |
| Example 9 | TAC | $9 \times 10^9$ | Absent | 0.3 | Good | 3H | 92 |
| Example 10 | TAC | $2 \times 10^8$ | Absent | 0.3 | Good | 3H | 92 |
| Example 11 | TAC | $2 \times 10^9$ | Absent | 0.3 | Good | 3H | 92 |
| Example 12 | TAC | $2 \times 10^9$ | Absent | 0.3 | Good | 3H | 92 |
| Example 13 | TAC | $2 \times 10^9$ | Absent | 0.3 | Good | 3H | 92 |
| Example 14 | TAC | $1 \times 10^9$ | Absent | 0.3 | Good | 3H | 92 |
| Example 15 | TAC | $2 \times 10^9$ | Absent | 0.3 | Good | 3H | 92 |
| Comparative Example 1 | TAC | $5 \times 10^{11}$ | Absent | 0.3 | Good | 3H | 92 |
| Comparative Example 2 | TAC | $8 \times 10^{11}$ | Present | 0.3 | Poor | 3H | 92 |
| Comparative Example 3 | TAC | OVER | Present | 0.3 | Poor | 3H | 92 |
| Comparative Example 4 | PET | $8 \times 10^{11}$ | Present | 0.5 | Poor | 3H | 92 |
| Comparative Example 5 | TAC | $5 \times 10^{11}$ | Absent | 0.3 | Good | H | 92 |
| Comparative Example 6 | TAC | $8 \times 10^{12}$ | Present | 0.3 | Poor | H | 92 |
| Reference Example 1 | TAC | $7 \times 10^5$ | Absent | 1.5 | Good | 3H | 89 |
| Reference Example 2 | TAC | $8 \times 10^{12}$ | Present | 0.3 | Poor | 3H | 92 |
| Reference Example 3 | TAC | $8 \times 10^8$ | Absent | 1.5 | Good | 3H | 89 |
| Reference Example 4 | TAC | OVER | Present | 0.3 | Poor | 3H | 92 |
| Reference Example 5 | TAC | $5 \times 10^{11}$ | Absent | 0.3 | Good | 3H | 92 |
| Reference Example 6 | TAC | $5 \times 10^{11}$ | Absent | 0.3 | Good | 3H | 92 |
| Reference Example 7 | TAC | $8 \times 10^{12}$ | Present | 0.3 | Poor | 3H | 92 |
| Reference Example 8 | TAC | $2 \times 10^9$ | Absent | 1.5 | Good | 3H | 89 |
| Reference Example 9 | TAC | OVER | Present | 0.3 | Poor | H | 92 |
| Reference Example 10 | TAC | $5 \times 10^{11}$ | Absent | 0.3 | Good | H | 92 |

Table 2 shows that the optical layered bodies of Examples of the present invention had excellent antistatic, optical characteristics, hardness, adhesion, and interference fringe prevention performance. On the other hand, none of the optical layered bodies of Comparative Examples was good in any of antistatic properties, optical characteristics, hardness, adhesion, or interference fringe prevention performance.

The optical layered body of Reference Example 1 had a high water content in the resin composition, and was poor in optical characteristics. The optical layered body of Reference Example 2 had a large amount of hydrophilic solvent used, and was poor in antistatic properties and adhesion. The optical layered body of Reference Example 3 was poor in optical characteristics because the hydrophilic solvent was not used. The optical layered body of Reference Example 4 was poor in antistatic properties and adhesion because the hydrophobic solvent was not used. The optical layered body of Reference Example 5 included a quaternary ammonium salt-containing polymer having a high weight-average molecular weight, and was poor in antistatic properties. The optical layered body of Reference Example 6 included a quaternary ammonium, salt-containing polymer having a low weight-average molecular weight, and was poor in antistatic properties. The optical layered body of Reference Example 7 included a binder resin in which a monomer component had a high weight-average molecular weight, and was poor in antistatic properties and adhesion. The optical layered body of Reference Example 8 included a binder resin in which an oligomer component (urethane oligomer) had a low weight-average molecular weight, and was poor in optical characteristics. The optical layered body of Reference Example 9 included a binder resin in which an oligomer component (urethane oligomer) had a high weight-average molecular weight, and the optical layered body was poor in antistatic properties, adhesion, and hardness. The optical layered body of Reference Example 10 was poor in antistatic properties and hardness because urethane oligomer was not used as the oligomer component in the binder resin.

INDUSTRIAL APPLICABILITY

The optical layered body of the present invention is suitably applicable to cathode-ray tube (CRT) display devices, liquid crystal displays (LCDs), plasma display panels (PDPs), electroluminescence displays (ELDs), field emission displays (FEDs), touch panels, electronic paper, and the like.

REFERENCE SIGN LIST

1 Triacetylcellulose substrate
2 Resin composition
3 Quaternary ammonium salt-containing polymer
4 Resin composition (penetration portion)
5 Resin composition (unpenetrated portion)
6 Hard coat layer
7 Blended layer
8 Low-refractive index layer

The invention claimed is:

1. A method for localizing a quaternary ammonium salt-containing polymer in a hard coat layer provided on a triacetylcelulose substrate of an optical layered body, which method comprises:
   applying a resin composition to the triacetylcelulose substrate for forming the hard coat layer, the resin composition containing a quaternary ammonium salt-containing polymer, a binder resin, and a solvent, wherein the solvent is a mixed solvent containing two or more solvents having different hydrophilicities and wherein less than 50% by mass of the mixed solvent is a hydrophilic solvent,
   selecting the quaternary ammonium salt-containing polymer to have a higher hydrophilicity than the binder resin, and
   selecting the binder resin to contain two or more resin components having different hydrophilicities,
   wherein the quaternary ammonium salt-containing polymer is localized in an upper part of the formed hard coat layer.

2. The method for localizing a quaternary ammonium salt containing polymer in a hard coat layer according to claim 1,
   wherein the quaternary ammonium salt-containing polymer is a copolymerized product of a dimethylaminoethyl methacrylate quaternary ammonium salt and a (meth)acrylate compound at a mass ratio of 1/99 to 90/10.

3. The method for localizing a quaternary ammonium salt-containing polymer in a hard coat layer according to claim 1,
   wherein the quaternary ammonium salt-containing polymer is contained in an amount of 1.0 to 10% by mass in the solids content of the resin composition.

4. The method for localizing a quaternary ammonium salt-containing polymer in a hard coat layer according to claim 1,
   wherein the two or more resin components having different hydrophilicities are a monomer having a weight-average molecular weight of 600 or less and an oligomer having a weight-average molecular weight of 1,000 to 10,000, and the hydrophilicity of the monomer is higher than that of the oligomer.

5. The method for localizing a quaternary ammonium salt-containing polymer in a hard coat layer according to claim 4,
   wherein the monomer having a weight-average molecular weight of 600 or less includes at least one selected from the group consisting of pentaerythritol tri(meth)acrylate, dipentaerythritol hexa(meth)acrylate, polyester tri(meth)acrylate, polyester di(meth)acrylate, isocyanuric acid ethylene oxide-modified tri(meth)acrylate, isocyanuric acid ethylene oxide-modified di(meth)acrylate, polyester ethylene oxide-modified tri(meth)acrylate, ethylene oxide-modified di(meth)acrylate, and propylene oxide-modified di(meth)acrylate, and
   the oligomer having a weight-average molecular weight of 1,000 to 10,000 is a urethane (meth)acrylate.

6. The method for localizing a quaternary ammonium salt-containing polymer in a hard coat layer according to claim 1,
   wherein the solvent contains a penetrating solvent having an ability to penetrate the triacetylcellulose substrate.

7. The method for localizing a quaternary ammonium salt-containing polymer in a hard coat layer according to claim 6, wherein, when the resin composition is applied to the substrate, the penetrating solvent and a binder resin component having a higher hydrophilicity penetrate into a surface of the substrate and the quaternary ammonium salt-containing polymer and a binder resin component having a lower hydrophilicity remain at the surface of the substrate with another member of the mixed solvent.

8. The method for localizing a quaternary ammonium salt-containing polymer in a hard coat layer according to claim 1,
   wherein the optical layered body has a surface resistance value of $1\times10^{11}$ Ω/□ or less, and a haze of 0.7% or less.

9. The method for localizing a quaternary ammonium salt-containing polymer in a hard coat layer according to claim 1, wherein the amount of the quaternary ammonium salt-containing polymer is 1.5% to 3.0% by mass of the solids content of the resin composition.

* * * * *